Patented July 5, 1938

2,122,795

UNITED STATES PATENT OFFICE 2,122,795

METHOD OF STABILIZING SULPHUR CONTAINING PETROLEUM OILS

Basil Hopper, Palos Verdes Estates, Calif., assignor to Union Oil Company of California, Los Angeles, Calif., a corporation of California No Drawing. Application June 15, 1936, Serial No. 85,325

4 Claims. (Cl. 196—41)

The present invention relates to the refining of hydrocarbon oils, and more particularly pertains to an improved process for treating and stabilizing hydrocarbon oils. The invention also contemplates the treatment of straight run or cracked distillates with certain chemical reagents of a particular nature which are effective in improving the quality of the distillates, particularly as regards their stability, the invention expressly covering a new process for stabilizing such hydrocarbon oil distillates after the latter have been subjected to a purifying treatment involving the use of copper-containing reagents.

Petroleum distillates such as kerosene or gasoline, obtained either by straight run distillation or by cracking petroleum hydrocarbons usually contain quantities of sulphur derivatives such as mercaptans, sulfides, thiophenes, etc., most of them being malodorous and corrosive impurities. The presence of such sulphur compounds is undesirable in that it renders the distillates unstable and accelerates the development of gummy or resinous substances during storage, particularly in the presence of polymerizing influences. Such sour distillates may be sweetened by treating the hydrocarbon oil distillates with a reagent of the type of copper chloride in the presence of air or other oxygen-containing gas. This treatment causes the oil-soluble sulphur compounds of the mercaptan type to be converted into the oil-soluble disulfides, the copper chloride reagent being recovered practically quantitatively.

However, some of the copper chloride is transformed into an oil-soluble copper naphthenate as well as other oil-soluble organic copper compounds which remains in the hydrocarbon distillate, these distillates then exhibiting a progressive tendency to discolor as well as to form resinous materials, polymers, as well as malodorous constituents.

It is therefore an object of the present invention to provide a novel reagent for treating such copper treated distillates to prevent or reduce the undesirable discoloration of such treated hydrocarbon distillates.

It has been discovered that these copper compounds (which are known to be oxidizing catalysts), found in the copper treated distillates, may be removed or precipitated out of solution in the distillates by treating said distillates with alkali metal or alkaline earth carbonates.

It has been further discovered that a copper treated oil fraction exhibiting discoloring, resin-forming, or polymer producing properties may be stabilized by bringing the oil into intimate contact with an alkaline or alkali earth metal carbonate subsequent to the treatment of the oil with the copper or like compound. Such treatment of the copper treated oil with the carbonate compound delays, reduces, or prevents discoloring and/or formation of resinous materials, polymers and oxidation products. It has been particularly discovered that a treatment of the copper treated oil fraction with a solution of sodium carbonate produces the desired results and renders said fraction stable. However, any of the alkaline or alkali earth carbonates which are water-soluble may also be used. Thus, potassium carbonate has been found to be an efficient equivalent.

Any method of intimately contacting the oil with the carbonate compound may be employed. Thus, the oil may be commingled with an aqueous solution of a water-soluble carbonate, such as sodium or potassium carbonate, followed by a separation of the stabilized oil from the aqueous carbonate solution. As an alternative the oil to be stabilized may be passed upwardly through a vertical column containing an aqueous solution of such carbonate.

The treatment of the copper treated oil by contacting it with the above described carbonate compound is carried out at ordinary temperatures. The time of contact of the oil with the carbonate compound is very short even at the ordinary room temperatures, provided intimate contact between the oil and the carbonate compound is obtained.

As an example of the realization of the process according to the present invention, the cracked gasoline obtained from a sulphur-bearing crude oil was treated in the following manner: A stream of cracked gasoline reacting sour to a "doctor" test was commingled with air in the proportion of approximately one cubic foot of air per barrel of gasoline and passed through a bed of calcium chloride for the purpose of drying the air-gasoline mixture. The dehydrated oil-air mixture was passed in contact with solid copper chloride precipitated on a carrier such as Bauxite. The treated oil was found to be sweet to the "doctor" test, the oil exhibiting no discoloration upon agitation with aqueous sodium plumbite and sulphur. Evaporation of a sample of this oil, however, showed considerable non-volatile residue. Upon prolonged standing, the copper treated gasoline discolored. The copper treated gasoline, immediately after being sweetened by the above described method of contacting the gasoline with cupric chloride, was therefore passed through a vertical chamber containing a 10 to 15% solution of sodium carbonate. The gasoline collected or removed from the surface of said solution was found to contain substantially no non-volatile residues and the gasoline did not show any discoloration, even upon prolonged standing.

Although the exact chemical reaction is not fully understood, it is now believed that the treatment of a copper treated gasoline with a water-soluble carbonate of the type of sodium carbonate converts the oil-soluble copper naphthenate into an insoluble copper carbonate and into a water-soluble naphthenate which is removed in the aqueous phase. The other oil-soluble organic copper compounds are also believed to be converted into insoluble and water-soluble salts, which leave the gasoline sweet and free from any tendency to discolor or to form resinous materials, polymers or other undesirable substances.

It is to be understood that the invention includes all such modifications and substitutions as come within the scope of the appended claims. Thus, although, the above treatment has been described in connection with copper treated gasolines, it may also be used when the sour distillate is initially treated with other compounds, such as mercuric chloride.

I claim:

1. In the process of sweetening petroleum oil containing corrosive sulphur-bearing compounds wherein the petroleum oil is contacted with a copper reagent comprising the step of contacting the copper treated oil with an alkali metal carbonate to stabilize the oil.

2. In the process of sweetening petroleum oil containing corrosive sulphur-bearing compounds wherein the petroleum oil is contacted with a copper reagent in the presence of an oxygen containing gas, the step of contacting the copper treated oil with an aqueous solution of an alkali metal carbonate to stabilize the oil against color deterioration or gum formation.

3. In the method of stabilizing sulphur containing petroleum oils against color deterioration or gum formation which oils have been subjected to treatment with a copper reagent, the steps of contacting said copper treated oil while in the liquid phase with an aqueous solution of an alkali metal carbonate and separating the stabilized oil from said solution.

4. In the method of stabilizing sulphur-bearing petroleum oils against color deterioration or gum formation which oils have been subjected to treatment with copper chloride, the steps of contacting the copper chloride treated oil with an aqueous solution of an alkali metal carbonate and separating the oil from said aqueous solution.

BASIL HOPPER.